(12) United States Patent
Suciu et al.

(10) Patent No.: US 7,845,157 B2
(45) Date of Patent: Dec. 7, 2010

(54) AXIAL COMPRESSOR FOR TIP TURBINE ENGINE

(75) Inventors: Gabriel Suciu, Glastonbury, CT (US); Gary D. Roberge, Tolland, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 875 days.

(21) Appl. No.: 11/719,317

(22) PCT Filed: Dec. 1, 2004

(86) PCT No.: PCT/US2004/040059

§ 371 (c)(1),
(2), (4) Date: May 15, 2007

(87) PCT Pub. No.: WO2006/059985

PCT Pub. Date: Jun. 8, 2006

(65) Prior Publication Data

US 2009/0148292 A1    Jun. 11, 2009

(51) Int. Cl.
*F02K 3/02* (2006.01)
(52) U.S. Cl. .................................. 60/226.1
(58) Field of Classification Search ........... 60/39.43, 60/226.1, 269, 262; 415/77; 416/175, 203, 416/193 R
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |

(Continued)

FOREIGN PATENT DOCUMENTS

DE    767704    5/1953

(Continued)

*Primary Examiner*—Michael Cuff
*Assistant Examiner*—Andrew Nguyen
(74) *Attorney, Agent, or Firm*—Carlson, Gaskey & Olds, P.C.

(57) ABSTRACT

A tip turbine engine (10) according to the present invention provides at least one gear (90) coupling rotation of a bypass fan (24) to an axial compressor (22), such that the axial compressor (22) is driven by rotation of the fan (24) at a rate different from than the rate of the fan. In one embodiment, the rate of rotation of the axial compressor (22) is increased relative to a rate of rotation of the fan (24). By increasing the rotation rate, the compression provided by the axial compressor is increased, while the number of stages of the axial compressor blades may be reduced. As a result, the length of the axial compressor and the overall length of the tip turbine engine are decreased.

19 Claims, 2 Drawing Sheets

U.S. PATENT DOCUMENTS

| | | | |
|---|---|---|---|
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE037,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |

| | | | | | |
|---|---|---|---|---|---|
| GB | 2026102 | 1/1980 | WO | 2006/059991 | 6/2006 |
| GB | 2095755 | 10/1982 | WO | 2006/059992 | 6/2006 |
| GB | 2191606 | 12/1987 | WO | 2006/059993 | 6/2006 |
| GB | 2229230 | 9/1990 | WO | 2006/059994 | 6/2006 |
| GB | 2265221 | 9/1993 | WO | 2006/059995 | 6/2006 |
| GB | 2401655 | 11/2004 | WO | 2006/059996 | 6/2006 |
| GB | 2410530 | 8/2005 | WO | 2006/059999 | 6/2006 |
| JP | 10184305 | 7/1998 | WO | 2006/060000 | 6/2006 |
| WO | 9902864 | 1/1999 | WO | 2006/060001 | 6/2006 |
| WO | 0127534 | 4/2001 | WO | 2006/060002 | 6/2006 |
| WO | 02081883 | 10/2002 | WO | 2006/060003 | 6/2006 |
| WO | 2004011788 | 2/2004 | WO | 2006/060004 | 6/2006 |
| WO | 2004022948 | 3/2004 | WO | 2006/060005 | 6/2006 |
| WO | 2004092567 | 10/2004 | WO | 2006/060006 | 6/2006 |
| WO | 2006/059968 | 6/2006 | WO | 2006/060009 | 6/2006 |
| WO | 2006/059969 | 6/2006 | WO | 2006/060010 | 6/2006 |
| WO | 2006/059972 | 6/2006 | WO | 2006/060011 | 6/2006 |
| WO | 2006/059973 | 6/2006 | WO | 2006/060012 | 6/2006 |
| WO | 2006/059974 | 6/2006 | WO | 2006/060013 | 6/2006 |
| WO | 2006/059975 | 6/2006 | WO | 2006/060014 | 6/2006 |
| WO | 2006/059976 | 6/2006 | WO | 2006/062497 | 6/2006 |
| WO | 2006/059977 | 6/2006 | WO | 2006059980 | 6/2006 |
| WO | 2006/059978 | 6/2006 | WO | 2006059990 | 6/2006 |
| WO | 2006/059979 | 6/2006 | WO | 2006060003 | 6/2006 |
| WO | 2006/059980 | 6/2006 | WO | 2006/059971 | 8/2006 |
| WO | 2006/059981 | 6/2006 | WO | 2006/059970 | 10/2006 |
| WO | 2006/059982 | 6/2006 | WO | 2006/110122 | 10/2006 |
| WO | 2006/059985 | 6/2006 | WO | 2006/110125 | 10/2006 |
| WO | 2006/059986 | 6/2006 | WO | 2006/059997 | 11/2006 |
| WO | 2006/059987 | 6/2006 | WO | 2006/110124 | 11/2006 |
| WO | 2006/059988 | 6/2006 | WO | 2006/110123 | 12/2006 |
| WO | 2006/059989 | 6/2006 | WO | 2006/112807 | 12/2006 |
| WO | 2006/059990 | 6/2006 | | | |

AXIAL COMPRESSOR FOR TIP TURBINE ENGINE

BACKGROUND OF THE INVENTION

The present invention relates to a tip turbine engine, and more particularly to an axial compressor for a tip turbine engine.

An aircraft gas turbine engine of the conventional turbofan type generally includes a forward bypass fan and a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In the known tip turbine engine designs, an axial compressor is directly driven by rotation of the hollow fan blades. The axial compressor compresses the incoming core airflow before sending it into the hollow fan blades. However, the axial compressor turns relatively slowly because it is directly driven by rotation of the hollow fan blades. Thus, the number of stages of the axial compressor may be increased in order to increase the amount of compression. Increasing the number of stages of the axial compressor increases the overall length of the engine.

SUMMARY OF THE INVENTION

A tip turbine engine according to the present invention provides at least one gear coupling the rotation of the fan to the axial compressor, such that the axial compressor is driven by rotation of the fan at a rate different from the rotation rate of the fan. In the disclosed embodiment, the rate of rotation of the axial compressor is increased relative to the rate of rotation of the fan. In this manner, the compression of the axial compressor is increased, even while the number of stages of compressor blades is reduced. As a result, the length of the axial compressor and the overall length of the tip turbine engine are decreased.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
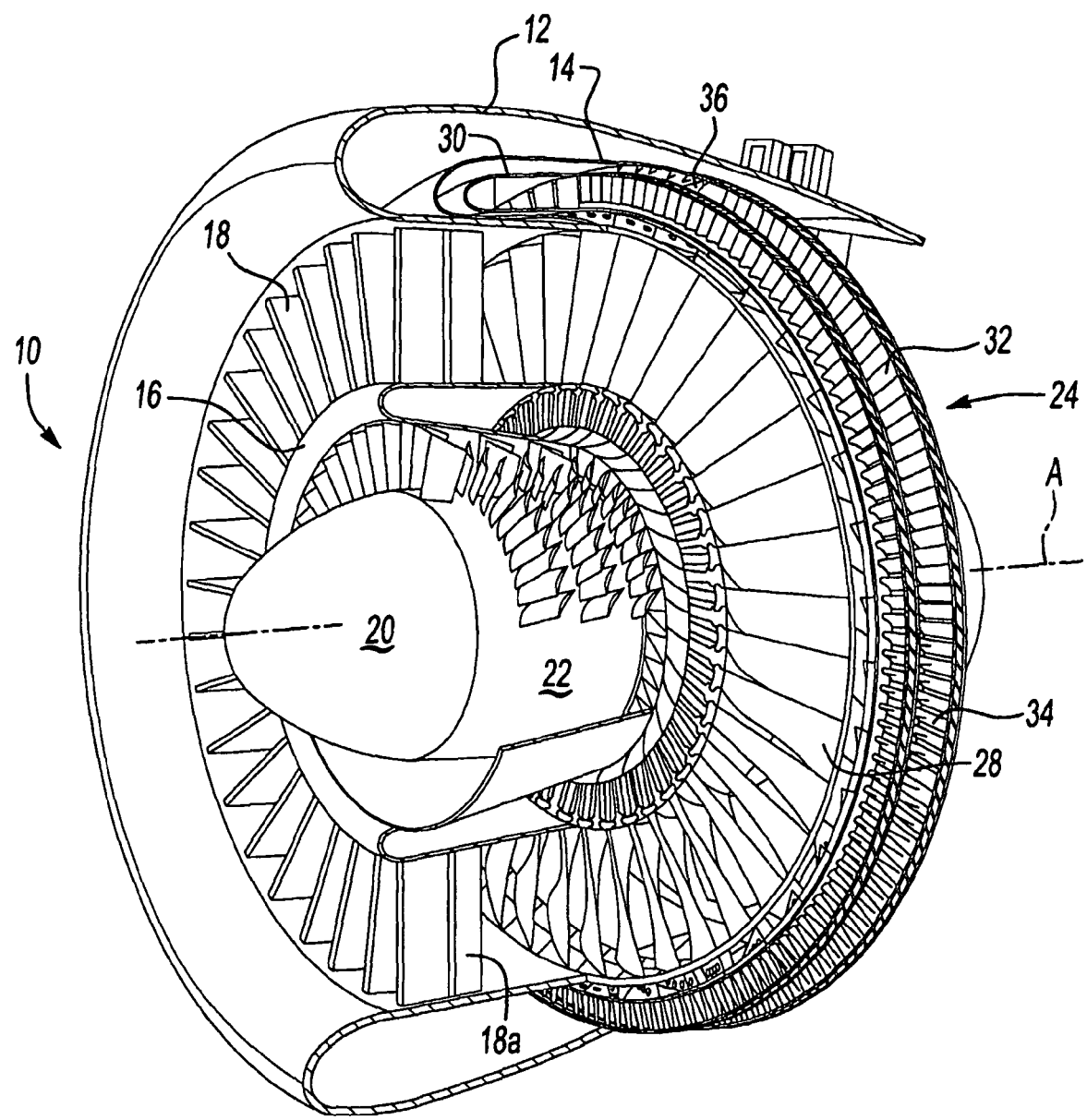
FIG. 1 is a partial sectional perspective view of a tip turbine engine according to the present invention.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32.

Figure 2:
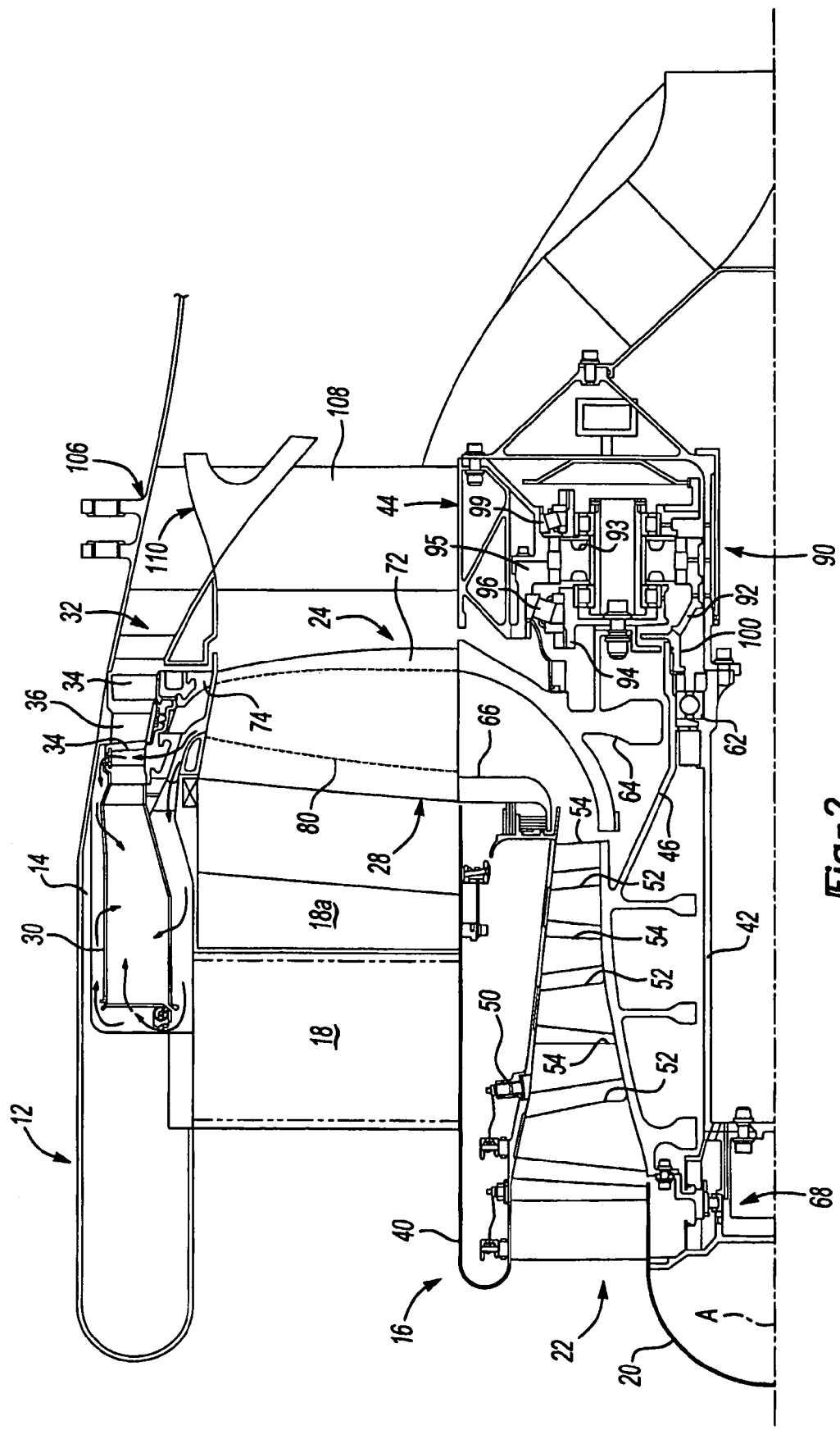
FIG. 2 is a longitudinal sectional view of the tip turbine engine of FIG. 1 taken along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, from which a plurality of compressor blades 52 extend radially outwardly, and a fixed compressor case 50, fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again toward an axial airflow direction toward the annular combustor 30. Preferably, the airflow is diffused axially forward in the engine 10, however, the airflow may alternatively be communicated in another direction.

A gearbox assembly 90 aft of the fan-turbine rotor assembly 24 provides a speed increase between the fan-turbine rotor assembly 24 and the axial compressor 22. In the embodiment shown, the speed increase is at a 3.34-to-one ratio. In the embodiment shown, the gearbox assembly 90 may be an epicyclic gearbox, such as the planetary gearbox shown, that provides co-rotating engagement between the fan-turbine rotor assembly 24 and an axial compressor rotor 46. The gearbox assembly 90 is mounted for rotation between the static inner support housing 42 and the static outer support housing 44.

The gearbox assembly 90 includes a sun gear 92, which rotates with the axial compressor 22, and a planet carrier 94, which rotates with the fan-turbine rotor assembly 24 to provide a speed differential therebetween. A plurality of planet gears 93 (one shown) are mounted to the planet carrier 94. The planet gears 93 engage the sun gear 92 and a ring gear 95. The gearbox assembly 90 is mounted for rotation between the sun gear 92 and the static outer support housing 44 through a forward bearing 96 and a rear bearing 99. The forward bearing 96 and the rear bearing 99 are both tapered roller bearings and both handle radial loads. The forward bearing 96 handles the aft axial load, while the rear bearing 99 handles the forward axial loads. The sun gear 92 is rotationally engaged with the axial compressor rotor 46 at a splined interconnection 100 or the like.

It should be noted that the gearbox assembly 90 could utilize other types of gear arrangements or other gear ratios and that the gearbox assembly 90 could be located at locations other than aft of the axial compressor 22. For example, the gearbox assembly 90 could be located at the front end of the axial compressor 22. Alternatively, the gearbox assembly 90 could provide a speed decrease between the fan-turbine rotor assembly 24 and the axial compressor rotor 46. Alternatively, a counter-rotating planetary gearbox could be provided. As yet another alternative, the gearbox 90 could be a star gearbox.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn drives the axial compressor 22 via the gearbox assembly 90. Rotation of the axial compressor 22 at a rotation rate higher than the rotation rate of the fan-turbine rotor assembly 24 improves the compression provided by the axial compressor with fewer stages of compressor blades 52. In this manner, the compression of the axial compressor 22 is increased, even while the number of stages of compressor blades 52 is reduced. As a result, the length of the axial compressor 22 and the overall length of the tip turbine engine 10 are decreased.

The fan-turbine rotor assembly 24 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
   a fan rotatable about an axis, the fan including a plurality of radially-extending fan blades, at least one of the fan blades defining a compressor chamber extending radially therein;
   at least one turbine mounted to outer ends of the fan blades;
   an axial compressor having an outlet leading toward the compressor chamber; and
   at least one gear coupling rotation of the fan to the axial compressor, such that the axial compressor is driven via the at least one gear by rotation of the fan.

2. The turbine engine of claim 1 wherein the at least one gear increases a rate of rotation of the axial compressor above a rate of rotation of the fan.

3. The turbine engine of claim 2 wherein the fan is rotatably driven by the at least one turbine.

4. The turbine engine of claim 3 wherein the axial compressor is rotatably driven by the at least one gear.

5. The turbine engine of claim 4 wherein the axial compressor includes at least one set of radially extending compressor blades.

6. The turbine engine of claim 1 wherein the axial compressor includes a plurality of axially-spaced sets of compressor blades, each of the plurality of axially-spaced sets of compressor blades rotatably driven by the rotation of the fan via the gear.

7. The turbine engine of claim 6 wherein the compressor chamber in the at least one of the fan blades leads to a combustor which generates a high-energy gas stream to drive at least one turbine at an outer circumference of the fan.

8. The turbine engine of claim 1 wherein the at least one gear includes at least one sun gear and at least one planet gear.

9. The turbine engine of claim 8 wherein the axial compressor includes at least one axial compressor rotor having a plurality of radially extending compressor blades, the axial compressor rotor coupled to the at least one sun gear.

10. The turbine engine of claim 9 wherein the at least one gear further includes a planet carrier carrying the at least one planet gear, the planet carrier coupled to the fan.

11. The turbine engine of claim 1 further including at least one combustor in communication with the at least one compressor chamber, the at least one turbine mounted aft of the at least one combustor.

12. The turbine engine of claim 11 further including at least one gear coupling the fan to the axial compressor.

13. The turbine engine of claim 12 wherein the at least one gear includes a sun gear and a planet gear.

14. The turbine engine of claim 13 wherein the at least one set of compressor blades is coupled to the sun gear.

15. The turbine engine of claim 14 wherein the at least one gear further includes a planet carrier carrying the planet gear, the planet carrier coupled to the fan.

16. The turbine engine of claim 11 further including at least one inducer between the axial compressor and the compressor chambers, the at least one inducer turning substantially axial flow from the axial compressor toward substantially radial flow in the compressor chambers.

17. A method of operating a turbine engine including the steps of:

rotatably driving a fan having a plurality of fan blades with a turbine adjacent an outer periphery of the fan; and rotatably driving an axial compressor rotor by rotation of the fan, the axial compressor rotor rotatably driven at a rate different from a rate of the fan, and further including the step of compressing air with the axial compressor rotor and guiding the compressed air radially outwardly through interiors of the plurality of fan blades toward the turbine.

18. The method of claim 17 further including the step of centrifugally compressing the compressed air in the interiors of the plurality of fan blades.

19. The method of claim 17 wherein the rate at which the axial compressor rotor is driven is higher than the rate of the fan.

\* \* \* \* \*